United States Patent [19]

Nomura et al.

[11] 4,241,367
[45] Dec. 23, 1980

[54] THIN FILM MAGNETIC HEAD

[75] Inventors: Noboru Nomura, Kyoto; Kenji Kanai, Neyagawa; Nobuyuki Kaminaka, Moriguchi; Norimoto Nouchi, Katano, all of Japan

[73] Assignee: Matsushita Electric Industrial Co., Ltd., Kadoma, Japan

[21] Appl. No.: 17,536

[22] Filed: Mar. 5, 1979

[30] Foreign Application Priority Data

Mar. 3, 1978 [JP] Japan .................................. 53/24887
Dec. 28, 1978 [JP] Japan ................................ 53/165644

[51] Int. Cl.³ .......................... G11B 5/14; G11B 5/20
[52] U.S. Cl. ..................................... 360/127; 360/123
[58] Field of Search ........................ 360/127, 126, 123

[56] References Cited

U.S. PATENT DOCUMENTS 4,127,884 11/1978 Nouchi et al. ....................... 360/127

FOREIGN PATENT DOCUMENTS 539319 11/1975 U.S.S.R. .................................... 360/127

Primary Examiner—Robert S. Tupper
Attorney, Agent, or Firm—Wenderoth, Lind & Ponack

[57] ABSTRACT

This invention provides a thin film magnetic head composed of at least one conductive body layer formed in a magnetic material substrate with grooves therein, each groove being filled with a non-magnetic material, an insulating layer formed on the face of the magnetic material substrate including the conductive body layers, and a magnetic material layer formed on the insulating body layer. To precisely form the groove, an electrolytic etching process of the substrate and an annealing process of the substrate surface layer are combined to provide an straight-line property of the groove and the groove section, circular in arc, with better reproducibility.

5 Claims, 20 Drawing Figures

THIN FILM MAGNETIC HEAD

BACKGROUND OF THE INVENTION

This invention relates to a thin film magnetic head and, more particularly, to a thin film magnetic head which is superior in efficiency as a magnetic head, which can provide superior recording characteristics with low electric power, and which has hardly any chippings caused through sliding contact against the magnetic medium, and a method suitable for manufacturing the thin film magnetic head.

FIG. 1 shows one example, in cross-section, of a conventional prior art two-winding type thin film magnetic head, wherein good conductive metals are adhered, by a method such as evaporation, electrodeposition, sputtering deposition or the like, on a magnetic material substrate 101 to form metallic layers 103 and 104 which are etched by a photo-etching technique to form a required pattern. An upper portion magnetic material layer 102 of permalloy or the like is formed, by a method of evaporation, electrodeposition, sputtering deposition or the like and with the photo-etching technique, to partially cover the conductive body layers 103 and 104 through an insulating layer 105. In this thin film magnetic head, the magnetic material substrate 101 and the upper portion magnetic material 102 approach towards each other at a gap portion 106 disposed between the conductive body layers 104 and 103. Thus, the magnetic flux generated through current flowing to a coil 103 for signals is leaked at gap portion 106 between the magnetic material substrate 101 and the upper portion magnetic material 102 and does not reach the contact face 107 against the recording medium. In this conventional head, the efficiency is inferior during the signal recording operation and high power is required to flow to the coil for signals. If such high power is not provided, the recording operation is made difficult, thus resulting in the head being impractical to use.

Also, FIG. 2 is a cross-sectional view of the thin film magnetic head of FIG. 1, seen from the contact face 107 against the magnetic medium, wherein a protective film 111 is adhered on the upper portion magnetic body 102 and, furthermore, a protective substrate 113 is bonded by a bonding resin layer 112 to protect the thin film from sliding or abrasion with respect to the magnetic medium. However, in this construction where the conductive body layers appear on the contact face, chipping 114, flowing in the conductive body layer or the like, is caused on the surface of the conductive layer 104 during service, whereby the magnetic characteristics of the head become worse and the sectional area of the conductive body layer 104 where the current flows becomes smaller. In addition, the tolerance value of the recording current changes to cause heating and disconnection during service, thus resulting in the head being impractical to use.

SUMMARY OF THE INVENTION

In view of the foregoing, this invention has been developed to provide a multi-track thin film magnetic head which does not substantially involve the disadvantages and deterioration inherent in the prior art magnetic head, and a method for manufacturing the thin film magnetic head.

Another object of this invention is to provide a thin film magnetic head which is superior in efficiency as a magnetic head, which can provide superior recording characteristics with low electric power and which has hardly any chippings caused through sliding contact against the magnetic medium, and a method suitable for manufacturing the thin film magnetic head.

These objects of this invention can be achieved by providing a thin film magnetic head composed of at least one conductive body layer formed on a magnetic material substrate with grooves therein, each groove being filled with a non-magnetic material, an insulating layer formed on the face of the magnetic material substrate including the conductive body layers, and a magnetic material layer formed on the insulating body layer. The magnetic material layer is formed to bridge the grooves and has a magnetic gap at a contact portion with a magnetic medium. Also, the conductive body layer is coupled with the magnetic material layer and the magnetic material substrate, in the magnetic circuit, on the groove to efficiently guide to the magnetic gap the magnetic fluxes generated in the conductive body layer. Since the magnetic material substrate is a ceramic substrate, to precisely form the groove, an electrolytic etching process of the substrate and an annealing process of the substrate surface layer are combined to provide an straight-line property of the groove and the groove section, circular in arc, with better reproducibility. This substrate including the grooves are polished into a flat surface for use as the substrate of the thin film magnetic head. Thereby, an efficient head can be provided with higher accuracy and with better reproducibility.

BRIEF DESCRIPTION OF THE DRAWINGS

These and other objects and features of this invention will become more apparent from the following detailed description taken in conjunction with preferred embodiments thereof with reference to the accompanying drawings, in which.

DETAILED DESCRIPTION OF THE INVENTION

Figure 1:
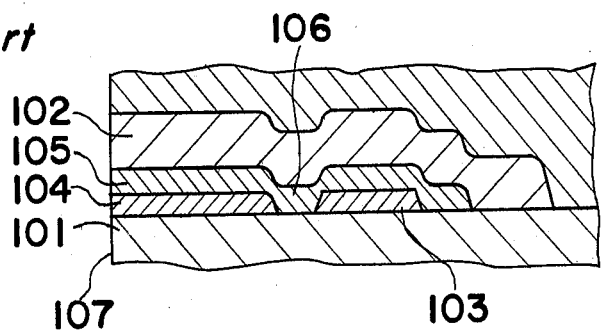
FIG. 1 is a cross-sectional view of a conventional two-winding type thin film head above described.

Before the description of the present invention proceeds, it should be noted that, for the sake of brevity, like parts are designated by like reference numerals throughout the accompanying drawings.

Figure 3:
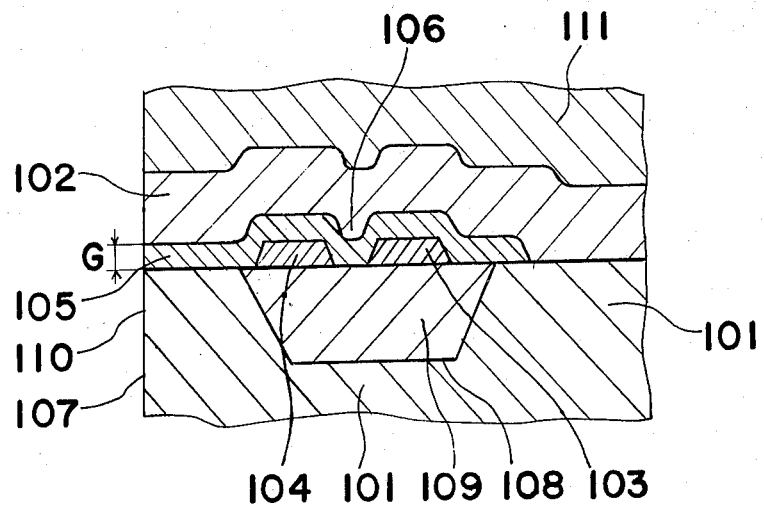
FIG. 3 is a cross-sectional view of a two-winding type thin film head in accordance with this invention.
Figure 4:
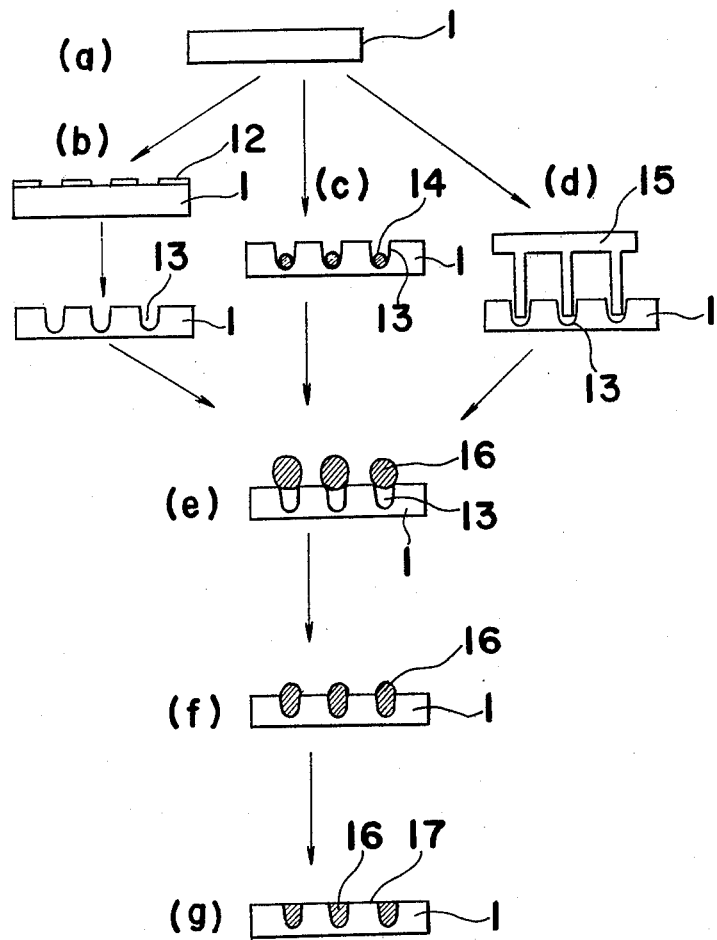
FIG. 4, (a) to (g), is a flow chart of a groove working operation for making the thin film head of this invention.

FIG. 3 shows the structure, in section, of one embodiment of the thin film magnetic head in accordance with this invention, and FIG. 4 is a flow chart showing steps for a method of providing a groove in a magnetic material substrate such as ferrite or the like to be employed for making the head.

Firstly, a method of providing a groove in the substrate 1 will be described hereinafter. To form grooves in the substrate 1 (FIG. 4(a)), such as ferrite or the like, polished into a mirror surface, an electrolytic etching method (FIG. 4(b)), a wire saw method (FIG. 4(c)), an ultrasonic wave processing method (FIG. 4(d)), a laser working method or the like may be used. According to the wire saw method, the width of the formed groove 13 is determined by the diameter of the wire 14, while according to the ultrasonic wave working method, the width of the formed groove is determined by the width of the blade 15. The operations of forming a groove of 100 microns or less by the current technology of these methods are difficult.

On the contrary, according to the electrolytic etching method, the groove width is determined by the window width of a resist mask 12 formed on the magnetic material substrate 1 such as ferrite or the like. Thus, the etching operation with a width of the window of 50 microns or less can be more easily carried out. For example, the electrolytic etching of Ni-Zn ferrite can be performed with an etching liquid of the sulfuric-phosphoric acid group. A non-magnetic insulating material 16, such as glass or the like, which is equal in thermal expansion coefficient to the magnetic material substrate 1 such as ferrite or the like, is placed (FIG. 4(e)) on each of the grooves 13 thus formed, and the non-magnetic insulating material 16 is heated and filled (FIG. 4(f)) into the grooves 13. The substrate 1 is again polished to form a flat face 17 (FIG. 4(g)) so that the non-magnetic insulating material and the magnetic material substrate are flush with each other. At this time, the polished face of the substrate 1 in the process (a) and the plane 17 in the process (g) are polished to be approximately parallel with each other.

As shown in FIG. 3, a non-magnetic conductive body layer of aluminum, gold, copper or the like is adhered, by a method such as evaporation, electrodeposition, sputtering deposition or the like, to the magnetic material substrate 101 thus formed, and is then selectively removed by a method such as photo-etching or sputter-etching or the like to thereby form a coil 104 and a coil 103. The coils 104 and 103 are formed to be almost positioned on a mold layer 109 of the non-magnetic insulating material filled into the groove as described hereinabove. Then, the coils 104 and 103 are electrically insulated and an insulating body layer 105 of SiO, $SiO_2$ or the like is formed by a method such as evaporation, sputtering deposition or the like to form a gap G. A magnetic material layer 102 such as permalloy or the like which partially covers the insulated coils 104 and 103 as described hereinabove and reaches the gap G is covered by a means of evaporation, electrodeposition, sputtering deposition or the like and is etched into a required shape by a method such as photo-etching or the like. A protective layer 111 for protecting the finally formed magnetic head is formed by a method such as evaporation, sputtering deposition or the like.

Problems in the groove working process of the magnetic head thus formed will be described hereinafter. The polished substrate qualities required in the completion stage of FIG. 4(g) are (1) a constant groove width and (2) a constant groove pitch. At this time, the finish accuracy of the groove width and the groove pitch is required to be several microns or less.

Under the above described conditions, by the present manufacturing process, the variation, torsion, undulation or the like of the substrate thickness directly influence upon the finishing condition.

Referring to FIG. 4(a), the substrate 1 polished to a mirror surface has variations of approximately $\pm 10$ microns in thickness within a substrate of 20 square mm. The average substrate thickness between the substrates within one lot in the mirror-surface polishing process has variations of approximately $\pm 5$ microns. Also, the torsion and undulation of the substrate are approximately $\pm 5$ microns, respectively.

When the substrate 1 is etched at the FIG. 4(c) process and is glass-molded at the FIG. 4(e) process, the torsion and undulation of the substrate are increased to $\pm 10$ microns. Also, when the substrate 1 is filled or pasted at the FIG. 4(f) process, the torsion or parallel degree of the substrate caused through the pasting operation becomes worse by $\pm 3$ microns within the substrate and, also, the polishing lap has undulations of $\pm 2$ microns. After the full process, these will be a parallel degree error of $\pm 30$ microns between the polishing lap and the polished face of the substrate. According to the parallel degree error, the polishing lap and the polished face become approximately parallel through lapping, and thus the variation in the groove depth inside the substrate is $\pm 25$ microns, and the groove depth between the substrates is adapted to have variation of $\pm 30$ microns. When the required groove depth is 5 microns or over, the leakage of the magnetic flux through an indentation 106 between the conductive body layers can be neglected. Thus, it is a problem how to reduce the above-described parallel degree error.

Generally, the inclined angle of the etching end face is considered to be approximately 60° during electrolytic etching unless a plasma etching method, a sputter etching method or the like is used. When the groove depth variation is 30 microns due to the inclination of the etching end face, the groove width has a variation of $\pm 17$ microns. Such large variations as described hereinabove cannot be tolerated in the following process, i.e., photo-etching the process of the conductive body layer.

Figure 5:
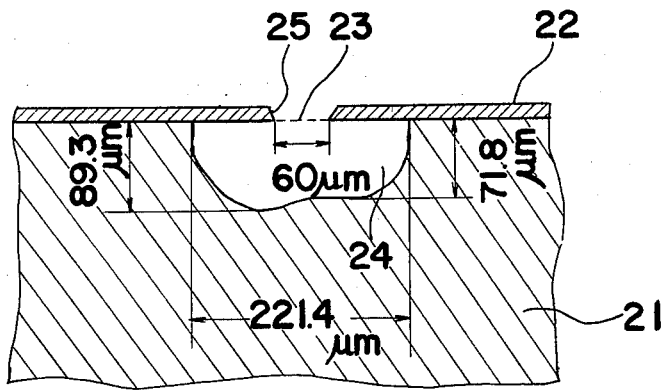
FIG. 5 is a cross-sectional view of the groove shape provided by etching, in accordance with this invention.

In this invention, the variations in the groove width and the groove pitch are improved through selection of the substrate material as shown within FIG. 5 which is a cross-sectional view of the groove formed on the material by the electrolytic etching in accordance with this invention. This substrate 21 is NiZn ferrite which is $10^4$ $\Omega m$ in specific resistance. As shown in FIG. 5, a circular arc around the end portion 25 on the opening portion 23 of the resist 22 is adapted to conform to the approximate shape of the etching section. When the etching section becomes approximately circular in arc, an angle made by the circular arc and the substrate surface becomes approximately 90°. Even if the groove depth of the substrate has variation of ±30 microns due to the polishing operation, the variation can be absorbed. Namely, assume that the groove depth is C, the change in groove width due to variation is given by an equation of $\{C(1-\sqrt{1-(\Delta/C)^2}\}$, wherein $\Delta$ is variation. When the groove depth C is assumed to be 100 microns and the variation is assumed to 30 microns, the groove width change becomes ±4.5, whereby the variation becomes one third as compared with the general etching case. Namely, when the sectional shape of the etching groove becomes closer to a circular arc, the variations in groove width and groove pitch caused through the variations in the groove depth can be absorbed.

Figure 6:
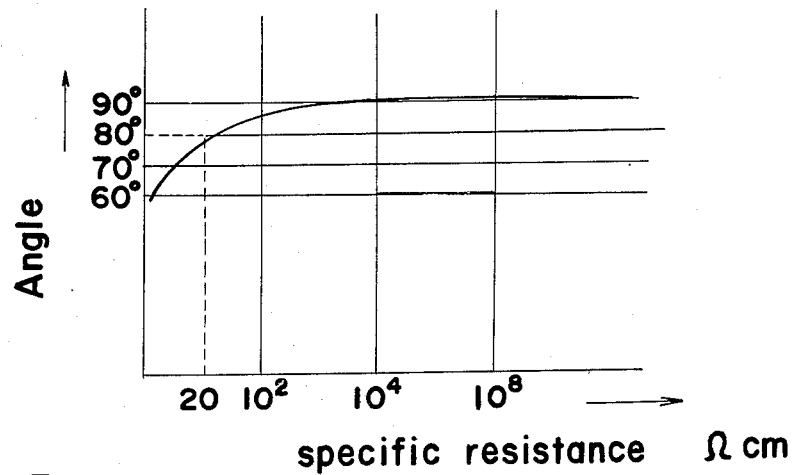
FIG. 6 is a graph showing dependence of inclined angle at the groove end portion through etching by substrate specific resistance.

Similarity of the sectional shape of the electrolytic etching groove to the circular arc relates to the specific resistance of the substrate. As shown in FIG. 6, in the MnZn ferrite of several $\Omega$cm in specific resistance, the inclination of the etching end face to the surface of the substrate is approximately 60°. At 20 $\Omega$cm, it becomes approximately 80°, while at $10^4$ $\Omega$cm, it becomes almost circular at arc. Also, in $10^8$ $\Omega$cm or more, large voltage is required to provide the current necessary for the electrolytic etching, whereby the insulation breakdown of the resist mask 12 is caused, thus resulting in impractical use. When an angle formed by the etching end face and the substrate surface becomes 80° or more, changes in the groove width and groove pitch depending upon the polishing amount become smaller and the variations can be sufficiently absorbed.

Figure 7:
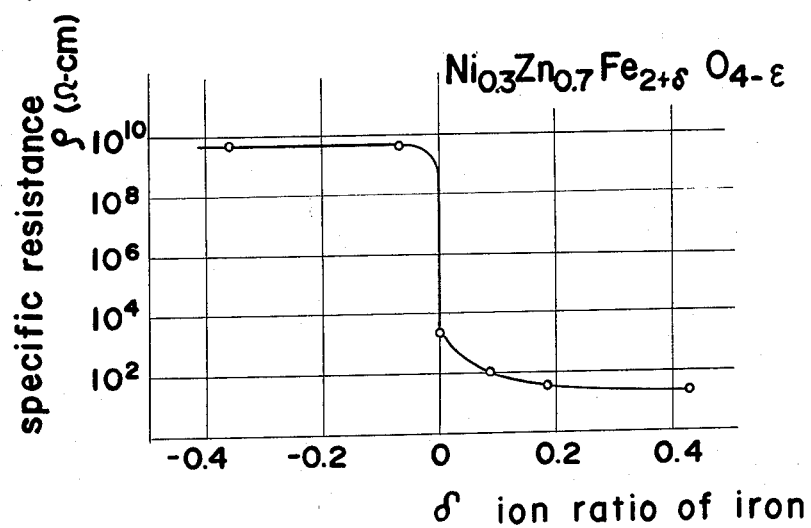
FIG. 7 is a graph showing the specific resistance variation by the composition of ferrite.

When a method is adopted of forming a groove, by electrolytic etching, in a magnetic material substrate having between 20 $\Omega$cm and $10^7$ $\Omega$cm specific resistance and thereafter performing the polishing operation, the above-described characteristics of (1) and (2) required in the completion stage of FIG. 4(g) can be satisfied if some variations exist in the magnetic material substrate. Also, the groove filled with the non-magnetic material is affected by variations in the local specific resistance in the substrate, thus resulting in changed groove width and groove depth. In particular, in the Ni—Zn group of ferrite, a single crystal cannot be produced and a sintered body substrate is used. Variations in specific resistance of the substrate of the sintered body substrate are approximately 10 times between the sintered ingots of the same composition. The variations are approximately several times between substrates cut from one sintered ingot. In addition, even within one cut substrate, the local variations in specific resistance may be approximately 40%. The local variations inside such substrate directly influence the straight-line property of the groove. This is caused through unequal properties in the mixture between the compositions constituting the sintered body, unequality in atmosphere during the sintering operation, or the like. As shown in FIG. 7, the inequality influences the divalent and trivalent ion ratios of the iron, and the inequality in delicate ion amount is considered to have large influences upon the variations of the specific resistance. Namely, the variations in the specific resistance within the substrate are caused through the method of manufacturing the sintered body and the composition of the ferrite and are considered to be caused more or less so long as the sintered body is used as the substrate. Also, the variations in specific resistance between the lots or between the substrates, when the electrolytic etching operation has been performed at the same conditions, cause the different groove widths and groove depths between the substrates and become obstacles to mass production.

In this invention, the substrate is cut from a sintered body and is annealed, and an electrically uniform layer is formed in at least one portion of the surface layer on the substrate. Then, the groove is formed by the etching method to provide a better straight-line groove and to reduce variations in the groove width between the substrates, thus resulting in improved yield.

When the substrate is of a high-resistance sintered body of $10^4$ $\Omega$cm or more in specific resistance, the substrate is polished to a mirror-surface. Thereafter, it is annealed in an atmosphere having reducing and neutral properties. In the case of a reducing atmosphere, oxygen is isolated from the ferrite of the substrate surface layer. More oxygen is discharged from the higher portion of the oxygen concentration in the substrate and the specific resistance of the substrate surface becomes low, but the specific resistance inside the substrate is equalized. The higher portion of the substrate surface and the lower portion thereof in oxygen concentration are moderated, and the local specific resistance on the substrate surface is equalized. When the layer uniform in specific resistance is formed on the substrate surface by annealing in the atmosphere, the etching can be performed regardless of the variations in specific resistance of the substrate bulk.

On the other hand, in a ferrite substrate of $10^3$ $\Omega$cm or less in specific resistance, the specific resistance is not largely affected by the variations in the composition of the ferrite. As a result, in the Ni—Zn group ferrite which is low in specific resistance, the variations in specific resistance inside the substrate are small. The straight-line property is superior when the groove is provided in a substrate having low specific resistance. However, assume that the opposed length of the conductor portion of each channel is several millimeters, the wire width is several hundred $\mu$m, the channel spacing is several tens $\mu$m when the specific resistance of the substrate is approximately $10^3$ $\Omega$cm and the resistance value between the channels becomes approximately several hundred $\Omega$, resulting in that the insulating characteristics become insufficient and the leakage current flow between the adjacent channels. This can be solved through formation on the substrate surface of a layer of a material which is superior in insulation. Namely, after the groove has been worked in the ferrite substrate, i.e., when the substrate is annealed in an oxidizing atmosphere after the etching operation of the groove in the ferrite substrate, the specific resistance on the substrate surface becomes larger, and the leakage between the channels.

Figure 8:
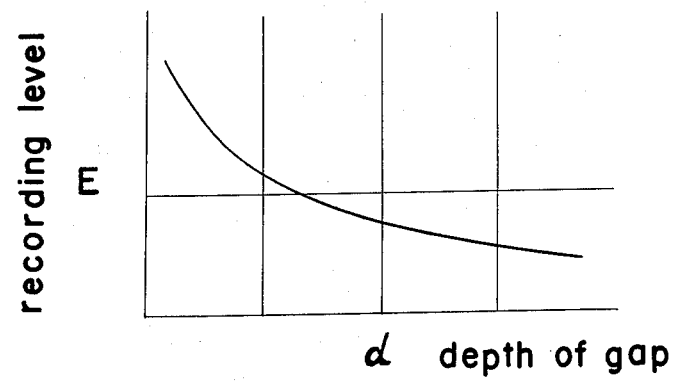
FIG. 8 is a graph showing the gap depth dependence of relative output for recording level.

The groove width changes not only by fluctuation of the groove width caused by variations in specific resistance of the above-described substrate, but also by a weak adhesion force between the substrate and the resist layer. This is caused by an insufficient adhesion force between the ferrite and the resist. At first, metals such as aluminum, chromium, etc. are adhered to the ferrite and a resist layer is formed thereon. The bonding property as a whole is improved, since there is good adherence between the ferrite substrate and the metallic thin film and between the metallic thin film and the resist layer. Generally, although the metal is electrolytically etched, the metallic film serves its part to increase the bonding force of the resist without being electrolytically etched, since a sufficient voltage is not applied, upon the metalic film adhered on the ferrite substrate, by the difference in resistance value between the ferrite and the metallic film as in this invention. Adherence of the metallic film as described hereinabove improves the straight line property of the groove. The relationship of the magnetic head thus manufactured between the gap depth d and the recording level E is shown in FIG. 8, wherein variations in the gap depth greatly change the output values in accordance with changes in the recording level. However, by the method of this invention, the groove widths become equal and the output values become equal. More specifically, the gap depth d is closely related to the groove width, with the groove width controlling the gap depth d. Particularly, in thin film magnetic heads of the multi-channel type, a multi-channel thin film magnetic head which has fewer variations between the channels can be provided.

A thin film magnetic head of a special stable groove structure is provided by the above described manufacturing method.

The construction of a magnetic head thus formed and particularly the positional relationship between a groove 108 and coils 103, 104 will be described hereinafter. The coil 103 is required to be located towards the sliding face 110 against the recording medium, and towards the rear end of the groove 108. This point will be described, considering the differences, in the magnetic heads shown in FIG. 1 and FIG. 3. When the coil 103 is confronted with the magnetic layer 102 through only the insulating layer 105 as shown in FIG. 1, the magnetic flux leaks through the coil 102 as the magnetic flux moves from the rear end portion to the sliding face 107. As a result, in the construction of FIG. 3, the coil 103 is located towards the sliding face 110, not towards the end of the groove 108, to reduce the leakage of the magnetic flux, thus preventing the efficiency from being lowered. Namely, when the coil is forwardly located on the non-magnetic insulating material 109 to be filled in the groove 108, the magnetic resistance becomes greater between the magnetic material substrate 101 and the upper portion magnetic material 102 through the non-magnetic insulating material 105 due to the great spacing between the magnetic material substrate 101 and the upper portion magnetic material 102. The leakage in the mold portion becomes less, and most of the magnetic flux flows to the magnetic circuit through the gap G. Also, regarding leakage through identation 106, which is a problem in FIG. 1, the magnetic resistance of that portion can be made the same in grade as the magnetic resistance of the other mold portion through provision of a sufficient depth of the groove 108 in FIG. 3. Assume that the depth of the groove 108 formed in the magnetic material substrate 101 is 50 microns and the film thickness of the coils 103, 104 are 1 micron respectively, the thickness of the insulating layer 105 forming the gap is 1 micron and the magnetic resistance of the indentation portion is lower, by approximately 2%, than that of the other portion, thus resulting in no remarkable change in magnetic flux leakage, while the coil 104 is electrically insulated from the coil 103. When one portion of the coil 104 is projected to a position closer to the sliding face 110 against the magnetic recording medium than to the groove 108, the magnetic flux leakage matters little, since one portion of the coil is close to the sliding face 110 against the magnetic medium.

In a thin film magnetic head where a flat plate with grooves in the magnetic material is the substrate, the groove being filled with non-magnetic insulating material and the surface being made flat, the recording efficiency is improved as compared with the conventional thin film magnetic head, allowing a superior recording to be made with a small signal current.

Figure 9:
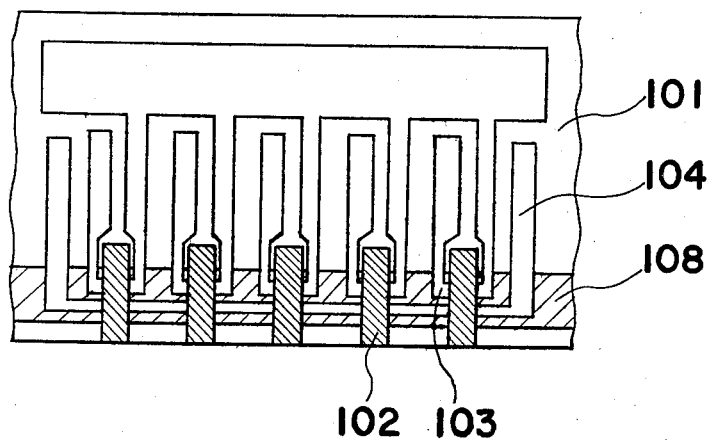
FIG. 9 is a cross-sectional view of a multi-channel head with bias coil thereon in accordance with this invention.
Figure 10:
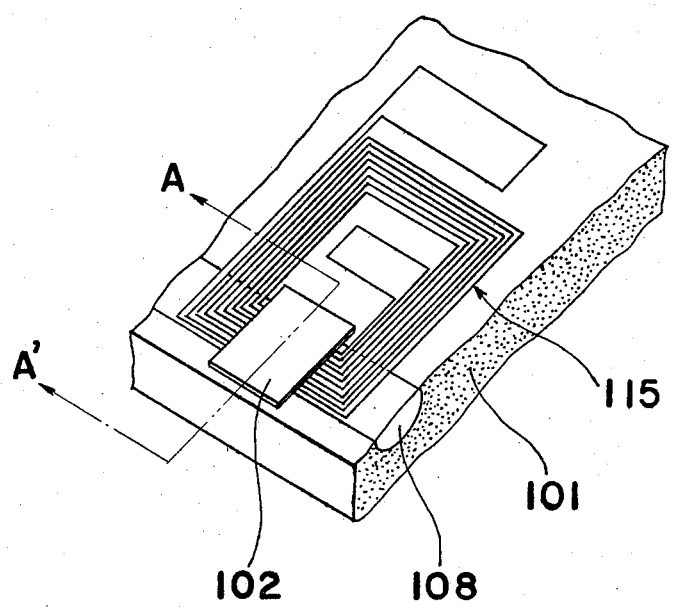
FIG. 10 is a perspective view of a multi-winding wire type thin film head in accordance with this invention.

The above-described embodiment relates a two-winding wire type thin film magnetic head, but is efficient even with the single winding wire type and multi-winding wire type heads. Particularly in the multi-winding wire type as shown in FIG. 10, the magnetic flux to be supplied to the gap portion G is reduced due to leakage as the coil is located closer to the rear end portion, in the case where the groove is not provided. The provision of the winding 115 on the groove structure of this invention becomes effective. Also, improvements in the above-described recording efficiency are effective even in a multi-channel type of thin film magnetic head of a common bias system which has the same sectional structure as that of the above-described two-winding wire type of thin film magnetic head. In the arrangement of FIG. 9, five channels are used, and the current flowing to the signal coil of each channel 103 can be reduced to approximately one fifth due to the effect of the high frequency bias coil 104 provided commonly on each channel. More effect is provided commonly on each channel. In addition, more effect is provided with an increase in the number of channels because the magnetic flux generated by a signal coil located at the rear end portion of the groove is efficiently transmitted to the head gap portion. Such an effect can be realized through the effect of the groove structure.

Figure 2:
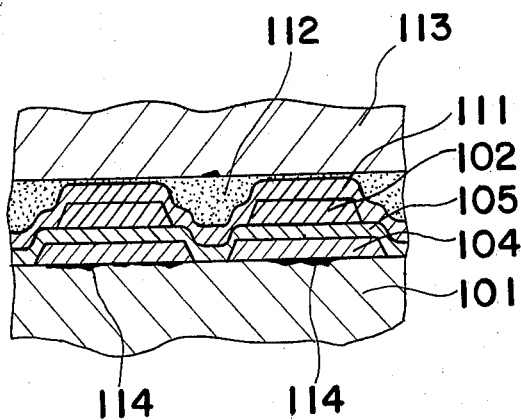
FIG. 2 is a cross-sectional view of the contact face of the conventional thin film head aganist the recording medium, above described.
Figure 11:
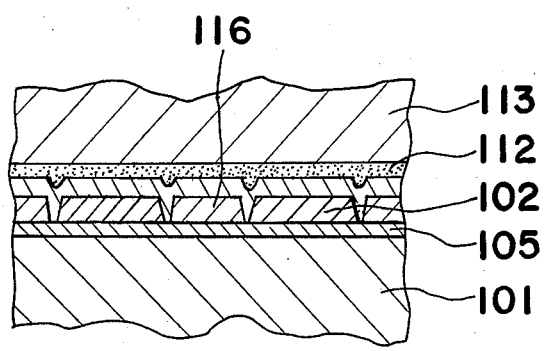
FIG. 11 is a cross-sectional view of a contact face of the multi-channel head against the recording medium in accordance with this invention.

FIG. 11 is a view seen from the recording medium body sliding face on the magnetic head of the multi-channel type shown in FIG. 9. A primary different point, as compared with the conventional type of thin film magnetic head (see FIG. 2), is that the conductive body layer is not exposed to the head front face. The chipping 114 or the like caused between the substrate 101 and the conductive body layer 104 as shown in FIG. 2 are removed in FIG. 11, thus providing the improved finish condition of the gap portion. The gap break or the like caused by contact sliding against the medium is removed, thus allowing good record reproduction to be made. However, the thickest portion of the built-up thin film becomes a portion where the insulating body layer or the magnetic material layer is adhered to the conductive body layer. The thickness of the conductive body layer becomes the thickness of a bonding resin layer 112 shown in FIG. 11, and it appears on the head front portion. Abrasion remains as a problem, particularly in a tape head or the like which comes into sliding contact with the recording medium, since chipping or breakage is caused from the soft bonding resin layer when the thin film magnetic head is used for long periods of time.

A second difference is that an insulating body layer equivalent to the thickness of the magnetic material layer is provided between the tracks to provide an abrasion resisting layer. Thus, the thicker portion of the bonding resin layer, between the tracks, caused in FIG. 2 is removed to realize a more flattened construction. This flattening operation can be performed upon the thickness of the conductive body layer.

Figure 12:
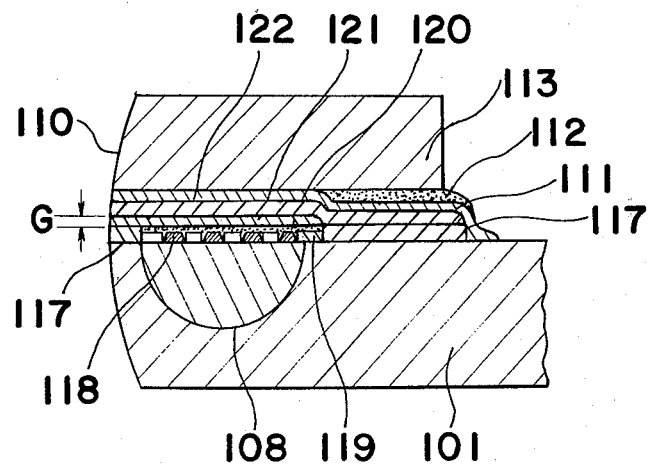
FIG. 12 is a cross-sectional view of another embodiment of the multi-winding wire type thin film head in accordance with this invention.

FIG. 12 is a cross-sectional view of the multi-winding wire type of thin film magnetic head, which is more flattened. A lower portion magnetic material layer 117 is formed on the magnetic material substrate 101 with the groove 108 therein. The lower portion magnetic material layer 117 is provided in a portion corresponding to the gap depth which reaches to the groove 108 from the contact face 110 against the magnetic medium and in a bonding portion with the upper portion magnetic material layer 122. The thickness of the upper magnetic material layer 117 is made greater than that of the conductive body layer 118. The film thickness of the conductive body layer is provided not to appear as the thickness of the adhering layer in the contact face against the magnetic medium. Referring to FIG. 12, since the upper portion magnetic material 122 covers the multi-winding wire type of conductive body layer 118, the pattern shape becomes narrower due to side etching in the stage difference portion. when the upper portion magnetic material layer is pattern-etched through the vertical steps on the unevenness of the conductive body layer. When the pattern becomes narrower, saturation at the stage difference portion of the upper portion magnetic material layer 122 becomes a problem, whereby sufficient recording efficiency is not provided. A insulating body layer 119, as thick as the conductive body layer 118, is adhered on the concave portion between the conductive body layers to reduce the stage difference portion. Thereafter, to adjust the thickness with respect to the lower portion magnetic material layer, an insulating body layer 120 is provided, and an insulating body layer 121 corresponding to the gap length is formed to adhere to the upper portion magnetic material layer 122 thereon.

Figure 13:
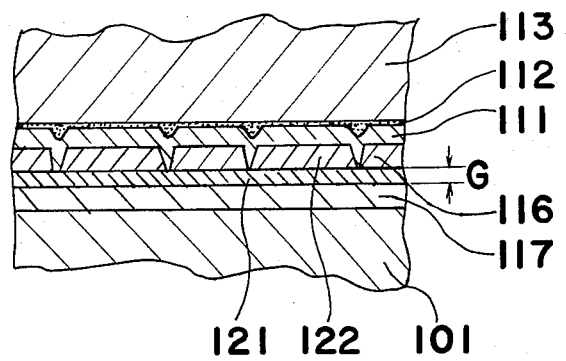
FIG. 13 is a cross-sectional view of a contact face of the head of FIG. 12 against the recording medium.

The contact face on the thin film magnetic head shown in FIG. 12 becomes as shown in FIG. 13, wherein the thickness of the bonding resin layer can be minimized.

When the head construction of FIG. 12 is adopted in terms of magnetic characteristics, a lower portion magnetic material layer which is different, in saturation magnetic flux density, from the subtrate can be selected. Namely, since the substrate used in this invention is made of a material, such as ferrite or the like, which is low in saturation magnetic flux density, the ferrite is saturated and it is impossible to make a recording when a recording medium which is larger in coercive force is used. The material near the saturable head gap is replaced by a material, such as permalloy or the like, which is higher in saturation magnetic flux density, and a recording can be made with a recording medium which has a larger coercive force.

Figure 14:
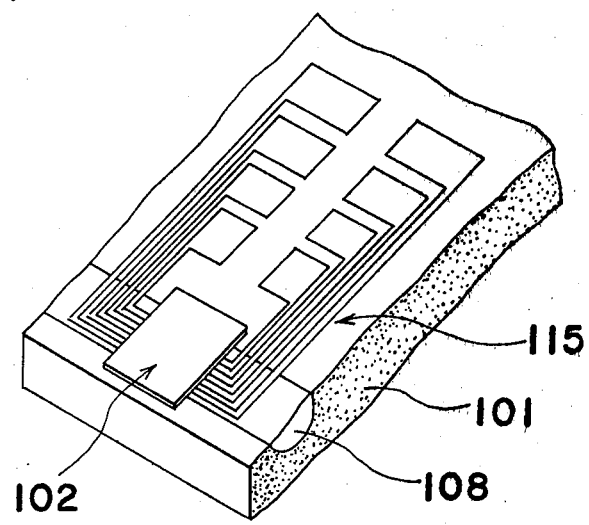
FIG. 14 is a perspective view of conductive body layers formed in parallel.
Figure 15:
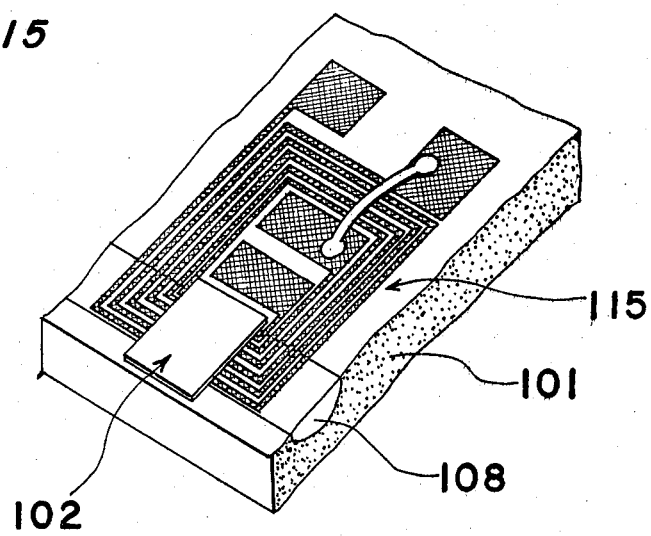
FIG. 15 is a perspective view of conductive body layers formed in two system rows.

Referring to FIG. 14 and FIG. 15, each conductive body layer on the groove and the magnetic layer is the same in construction as the multi-winding wire type where a spiral type of conductive body layer is provided, as in FIG. 10. However, when the series-parallel relation of each winding is different, the arrangement shown in FIG. 14 and FIG. 15 is provided. In FIG. 14, all the coils are formed in an electrically parallel relation, while in FIG. 15, the coils are arranged in two system rows. As shown, the use of a coil with an intermediate tap can be made, depending upon the connection. Also, in the parallel arrangement of the coil, different signals can be simultaneously applied. For example, high-frequency bias, DC bias, current for signals are fed to the head at the same time, whereby the storing operation can be made on the recording medium.

This invention provides a magnetic head which is superior in efficiency, which can provide superior recording characteristics with low electric power, and which has hardly any chippings, caused by sliding contact against the magnetic medium, the thin film magnetic head being of a structure wherein a conductive body layer which serves as a coil is provided on the grooves of the magnetic material substrate, the grooves being filled with a non-magnetic material.

Although the present invention has been fully described by way of example, it should be noted that various changes and modifications wil be apparent to those skilled in the art and, therefore, unless otherwise they depart from the true scope of the present invention they should be construed as included therein.

What is claimed is:

1. A thin film magnetic head comprising:
   a magnetic material substrate having a contact portion adapted to face a magnetic medium and a surface extending substantially perpendicularly of said contact portion;
   said substrate having formed in said surface thereof a groove;
   a non-magnetic insulating material filling said groove;
   at least one conductive body layer formed on said non-magnetic insulating material and extending substantially parallel to said groove;
   a magnetic gap made of a non-magnetic insulating body layer formed over said magnetic material substrate and extending from said contact portion at least to said groove;
   an upper portion magnetic material layer covering said magnetic gap and said magnetic material substrate; and
   a magnetic circuit formed around said groove by said magnetic material substrate, said magnetic gap, said upper portion magnetic material layer and said conductive body layer.

2. A head as claimed in claim 1, further comprising a lower portion magnetic material layer adhered to said surface of said magnetic material substrate at least from said contact portion to said groove.

3. A head as claimed in claim 2, wherein the thickness of said conductive body layer is less than the thickness of said lower portion magnetic material layer.

4. A head as claimed in claim 3, further comprising an additional non-magnetic insulating body layer formed over said conductive body layer, and the sum of the thickness of said conductive body layer and the thickness of said additional non-magnetic insulating body layer is equal to the thickness of said lower portion magnetic material layer.

5. A head as claimed in claim 2, wherein the saturation magnetic flux density of said lower portion magnetic material layer is greater than the saturation magnetic flux density of said magnetic material substrate.

* * * * *